Feb. 22, 1966  L. S. REGIS, JR., ET AL  3,236,371
TICKET ORIENTATION BOX
Filed Jan. 7, 1965

INVENTORS
LEO STANLEY REGIS, JR.
CARL A. BERGMANN
BY James P McAndrews
ATTORNEY

United States Patent Office 3,236,371
Patented Feb. 22, 1966

3,236,371
TICKET ORIENTATION BOX
Leo Stanley Regis, Jr., and Carl A. Bergmann, Sturbridge, Mass., assignors to American Optical Company, Southbridge, Mass., a voluntary association of Massachusetts
Filed Jan. 7, 1965, Ser. No. 423,953
1 Claim. (Cl. 206—74)

The field of this invention is that of data processing equipment and the invention relates more particularly to a novel and improved container for collecting and orienting tags used in electronic data processing.

In present systems of inventory control and the like using data processing equipment, data on each inventory item or the like are recorded on a suitably punched or imprinted tag. As transactions occur affecting the status of the inventory or other subject of control, the tags relating to items involved in the transactions are collected. At intervals, these collected tags are oriented relative to each other to face in the same direction and are arranged in bundles. The bundled and oriented tags are then fed through electronic data processing equipment to consolidate the data on the tags and to provide reports on the status of the inventory. For example, each item stocked in a department store is provided with a tag imprinted on one side with information as to the style, price, type, location, etc. of the item. This tag is removed when the item is sold and, at the present time, is loosely deposited in a box near the store's cash register. At the close of the business day, the collected tags are manually sorted, oriented relative to each other and arranged in bundles and are then fed through data processing equipment to prepare daily reports on the store activities. In other inventory control systems where large numbers of inventory items are supplied by a single manufacture, each group of inventory item is stored with a group of suitably imprinted tags. As each item is removed from the inventory for use or sale, a related tag is selected and deposited in a collecting box. At the end of the day or other selected period, the collected tags are manually sorted, oriented and bundled and are forwarded to the manufacturer. The tags are then electronically processed by the manufacturer to prepare reports on the inventory status, to automatically order replenishment of the removed items and to issue bills for the replenished items.

In these data processing systems, the manual sorting, orienting and bundling of large groups of collected tags is a time-consuming and tedious job. Frequently tags handled in this way are improperly oriented in the bundles and are rejected from the data processing equipment without having been properly processed. In addition, the task of sorting, orienting and bundling the tags imposes a delay between the close of the collecting period and the beginning of the electronic processing of the tags. In department store inventory control systems which are based on daily and weekly reports, these delays can be inconvenient and frequently increase the expense of the inventory control procedure.

It is an object of this invention to provide a novel and improved container for collecting and orienting data processing tags; to provide such a container which orients said tags as they are collected; to provide such a container in which said tags can be collected only when the tags are properly oriented relative to each other; and to provide such a novel and improved collecting device or container in which data processing tags are conveniently and accurately oriented relative to each other and arranged in bundles as the tags are collected.

Other objects, advantages and details of the tag collecting and orienting container appear in the following detailed description of preferred embodiments of the invention, the description referring to the drawing in which.

Figure 1:
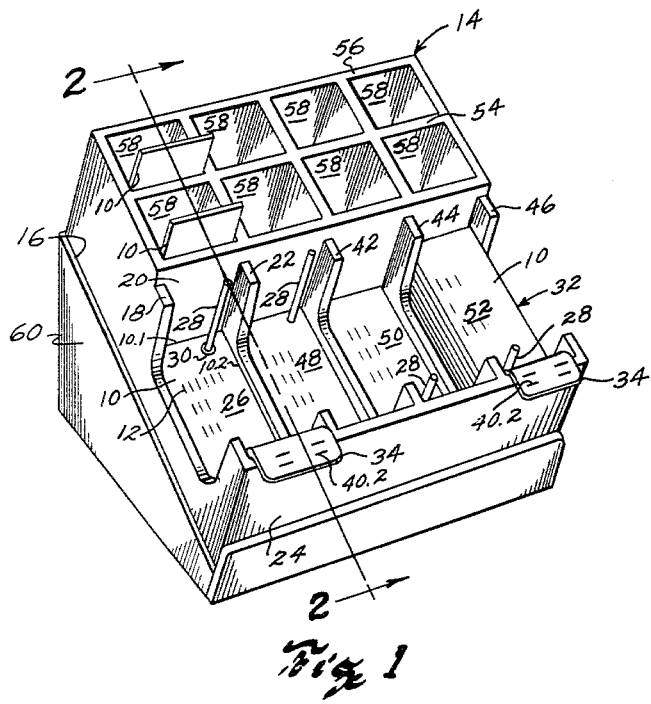
FIG. 1 is a front perspective view of the tag collecting and orienting container provided by this invention.
Figure 2:
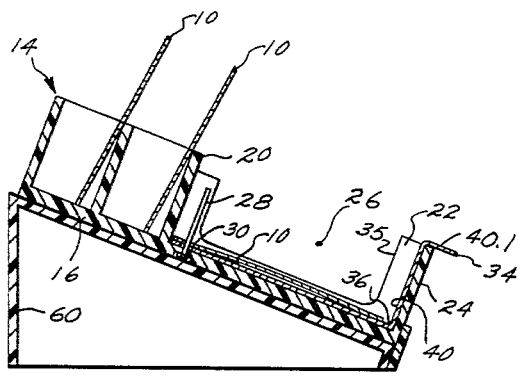
FIG. 2 is a section view along line 2—2 of FIG. 1.

Referring to the drawings, 10 in FIGS. 1 and 2 indicates a conventional electronic data processing tag of the type used in various inventory control systems and the like. In department store inventory control systems, for example, such tags are usually pinned, sewn or otherwise removably attached to items (not shown) which are offered for sale in the store. In other inventory control systems, the tags are stored in a drawer or bin in close proximity to the goods to which the tags relate. As will be understood, the tags are suitably imprinted on one side as at 12 to records the type, style, price, location. etc. of the item to which the tags are attached or related and this printing is adapted to be scanned and interpreted by electronic data processing equipment (not shown) in conventional manner. The tags are withdrawn from the drawers or bins or removed from the inventory items as the items are used or sold. The tags are then collected and are oriented relative to each other in bundles so that the imprinting 12 on all of the tags in each bundle faces in the same direction. The properly oriented and bundled tags are then fed through conventional data processing equipment (not shown) so that the data recorded on the tags is collated or otherwise processed by the equipment in conventional manner to provide reports on the status of said inventories.

As shown in the drawings, 14 in FIGS. 1 and 2 indicates the novel and improved tag collecting and orienting container provided by this invention. This container includes a base 16 walls 18, 20, 22 and 24 upstanding from the base to define an open-topped enclosure 26, and pin means 28 upstanding from the base within the enclosure. The container is preferably formed of plastic material having a pin 28 press-fitted therein as illustrated in FIG. 2 but the container can also be formed of other materials in other conventional ways.

In accordance with this invention, each of the data processing tags 10 is provided with at least one asymmetrically located aligning aperture 30 at a selected location on the tag. The enclosure 26 is then proportioned so that the container walls are adapted to engage at least two, preferably adjacent, lateral edges 10.1 and 10.2 of a tag inserted within the enclosure for aligning the edges of the tag in the enclosure. In addition, the pin means 28 is asymmetrically located in the enclosure to fit within tag-aligning aperture 30 when the tag edges 10.1 and 10.2 are engaged with said container walls but only when the side of the tag imprinted at 12 is oriented to face in a single direction. In this arrangement, all tags inserted within the enclosure 26 will then form a bundle (such as is indicated at 32 in FIG. 1) in which all of the tags are oriented relative to each other to face in the same direction.

Figure 3:
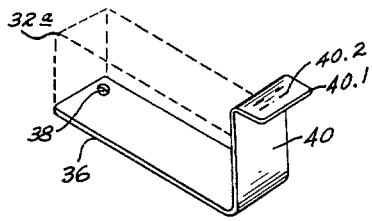
FIG. 3 is a front perspective view of a lift member used in the container provided by this invention.

In a preferred construction according to this invention, a lift member 34 having a flat plate portion 36 is fitted within the enclosure 26 with the plate portion of the member resting on the container base, see FIG. 2. The plate is apertured at 38 to fit over the pin means 28 and has a handle 40 upstanding from the plate to extend out of the enclosure 26. Preferably the end 40.1 of the handle is shaped as shown in the drawings so that it can be clearly marked as at 40.2 and so that the handle can be easily grasped. In this construction, the lift member 34 is adapted to be withdrawn from the container enclosure 26 for conveniently removing a bundle of properly oriented tags (such as is indicated at 32) from the enclosure. The container walls are preferably recessed as at 35 to facilitate removal of tags from the enclosure. The lift member plate fits around the pin 28 to assure that the bundle of tags is easily lifted without tending to bind on the pin. In addition, the handle portion of the lift member serves to engage the edge of a bundle of tags being withdrawn from the enclosure (as indicated by the dotted lines 32a in FIG. 3) for temporarily retaining the tags in neatly oriented relation to each other on the lift member. As will be understood, a rubber band or the like (not shown) can be easily slipped over the lift member 36 and over the bundle of tags indicated at 32a in FIG. 3 for securing the oriented tags together in bundled relation. The lift member plate 36 is then slipped out of the secured tag bundle and returned to the container enclosure 26.

The container 14 has thus far been described with reference to a single enclosure 26 but, in a preferred construction according to this invention, the container has additional walls 42, 44 and 46 upstanding from the base 16 for defining additional tag collecting and orienting enclosures 48, 50 and 52. These additional tag orienting enclosures are useful for collecting tags relating to different types of transactions. For example, where the enclosure 26 is used to receive tags relating to department store sales, the enclosure 48 can be used to receive tags relating to items returned to the store. Lift members 34 are preferably used in all of these tag-collecting enclosures although only two of the members have been shown for clarity of illustration.

In the preferred construction, the container 14 has other walls 54 and 56 upstanding from the base 16 to define additional enclosures 58. These additional enclosures are adapted to collect tags such as non-standard or odd-sized tags without requiring orientation of the tags therein. These enclosures 58 are also useful for holding tags 10 relating to items held in an inventory. Such tags can then be removed from enclosures 58 and collected and oriented in enclosure 26, for example, when inventory items to which the tags relate are used or sold. In a preferred embodiment of this invention, platform means 60 mount the container 14 so that the open tops of the container enclosures are tilted relative to the horizontal to facilitate the tags within the enclosures.

It should be understood that although particular embodiments of the container of this invention have been described by way of illustration, this invention includes all modifications and equivalents of the described embodiments which fall within the scope of the appended claim.

We claim:

A device for collecting and orienting electronic data processing tags which have asymmetrically located aligning apertures, said device comprising a container having a base, walls upstanding from said base defining an open-topped enclosure for receiving said tags therein and for engaging lateral edges of said tags, pin means upstanding from said base within said enclosure in spaced parallel relation to said walls, said pin means being spaced at unequal distances from said walls so that said pin means is asymmetrically located in said enclosure to fit within tag aligning apertures when said tag edges are engaged with said walls only when said tags have a selected orientation in said enclosure, a lift member having a plate apertured to fit around said pin means and to rest on said base within said enclosure, said lift member having handle means extending out of said enclosure parallel to said pin means alongside one of said walls by which said member can be withdrawn from said enclosure for removing collected and oriented tags from said enclosure, and additional means upstanding from said base defining a supplementary enclosure to hold tags without regard to their orientations, and means for mounting said container with said open enclosure top inclined to the horizontal for receiving tags therein and with said one wall disposed relatively lower than the other walls of said enclosure for facilitating removal of the lift member.

References Cited by the Examiner

UNITED STATES PATENTS

| | | | |
|---|---|---|---|
| 467,770 | 1/1892 | Colby. | |
| 1,007,368 | 10/1911 | McGarrity. | |
| 1,342,243 | 6/1920 | Wilson. | |
| 1,658,085 | 2/1928 | Hudson. | |
| 1,945,773 | 2/1934 | Demmerlein | 206—73.32 |
| 2,103,578 | 12/1937 | Ford. | |
| 2,568,405 | 9/1951 | O'Malley | 211—133 |
| 2,691,447 | 10/1954 | Schiffer | 206—73.61 |
| 2,898,705 | 8/1959 | Carlson. | |

THERON E. CONDON, *Primary Examiner.*